(12) United States Patent
Peterson et al.

(10) Patent No.: US 11,547,056 B2
(45) Date of Patent: Jan. 10, 2023

(54) FRAME ASSEMBLY FOR AN AGRICULTURAL ROUND BALER

(71) Applicant: CNH Industrial America LLC, New Holland, PA (US)

(72) Inventors: C. Brandon Peterson, West Grove, PA (US); Jonathan Shenk, Lititz, PA (US); Enrico Giuliani, Russi-RA (IT)

(73) Assignee: CNH Industrial America LLC, New Holland, PA (US)

( * ) Notice: Subject to any disclaimer, the term of this patent is extended or adjusted under 35 U.S.C. 154(b) by 370 days.

(21) Appl. No.: 16/815,726

(22) Filed: Mar. 11, 2020

(65) Prior Publication Data
US 2021/0282330 A1    Sep. 16, 2021

(51) Int. Cl.
*A01F 15/08* (2006.01)
*A01F 15/07* (2006.01)

(52) U.S. Cl.
CPC .............. *A01F 15/08* (2013.01); *A01F 15/07* (2013.01)

(58) Field of Classification Search
CPC ...................... A01F 15/07; A01F 15/08; A01F 15/071–0715; A01F 2015/072–076; A01F 2025/142; A01F 2025/145
USPC .......................................................... 56/341
See application file for complete search history.

(56) References Cited

U.S. PATENT DOCUMENTS

| | | | | |
|---|---|---|---|---|
| 4,228,638 A | * | 10/1980 | Rabe ................... | A01F 15/0816 100/88 |
| 4,321,787 A | * | 3/1982 | Holdeman .......... | A01F 15/0765 56/341 |
| 4,375,187 A | * | 3/1983 | Kluver ................ | A01F 15/0883 100/88 |
| 4,580,398 A | * | 4/1986 | Bruer .................. | A01F 15/0705 53/118 |
| 4,599,844 A | * | 7/1986 | Clostermeyer ..... | A01F 15/0715 53/118 |
| 4,619,106 A | * | 10/1986 | van der Lely .......... | A01F 15/07 56/341 |
| 4,651,512 A | * | 3/1987 | van der Lely ...... | A01F 15/0705 100/88 |
| 4,656,812 A | * | 4/1987 | Busse ................. | A01F 15/0715 53/118 |

(Continued)

FOREIGN PATENT DOCUMENTS

| | | |
|---|---|---|
| CN | 108243732 A | 7/2018 |
| EP | 0234634 A1 | 9/1987 |

(Continued)

OTHER PUBLICATIONS

Extended European Search Report for EP Application No. 21161889.7 dated Aug. 18, 2021 (six pages).

*Primary Examiner* — Dariush Seif
(74) *Attorney, Agent, or Firm* — Peter Zacharias; Patrick Sheldrake

(57) ABSTRACT

A frame assembly of an agricultural round baler. The agricultural round baler includes at least one roller and a tail gate. The frame assembly includes a main frame and a pair of frame modules removably connected to the main frame. Each frame module of the pair of frame modules includes at least one roller mount configured for mounting the at least one roller and a tail gate mount configured for mounting the tail gate and defining a pivot axis of the tail gate. The pair of frame modules defines a baler size for producing a correspondingly sized round bale.

18 Claims, 4 Drawing Sheets

(56) References Cited

U.S. PATENT DOCUMENTS

| | | | | |
|---|---|---|---|---|
| 4,698,955 A * | 10/1987 | Wagstaff | A01F 15/0833 | 100/88 |
| 4,821,637 A * | 4/1989 | Viaud | A01F 15/0883 | 100/88 |
| 4,870,812 A * | 10/1989 | Jennings | A01F 15/07 | 100/88 |
| 5,115,734 A * | 5/1992 | Quartaert | A01F 15/0705 | 100/88 |
| 5,255,501 A * | 10/1993 | McWilliams | A01F 15/106 | 100/88 |
| 5,367,865 A * | 11/1994 | Jennings | A01F 15/0833 | 100/88 |
| 6,021,622 A * | 2/2000 | Underhill | A01F 15/0715 | 53/118 |
| 6,098,391 A * | 8/2000 | Underhill | A01F 15/0833 | 100/88 |
| 6,722,110 B1 * | 4/2004 | Royneberg | A01F 15/071 | 100/15 |
| 7,467,507 B2 * | 12/2008 | Viaud | A01F 15/07 | 100/88 |
| 8,656,686 B2 * | 2/2014 | Smith | A01F 15/0715 | 53/399 |
| 8,746,137 B1 * | 6/2014 | Henry | A01F 15/0883 | 100/88 |
| 8,776,679 B1 * | 7/2014 | Henry | A01F 15/0883 | 100/88 |
| 9,295,198 B2 * | 3/2016 | Simmons | A01F 15/18 | |
| 10,194,595 B2 * | 2/2019 | Smith | A01F 15/0883 | |
| 2001/0013214 A1 * | 8/2001 | Viaud | A01F 15/0705 | 53/116 |
| 2002/0100375 A1 * | 8/2002 | Deutsch | A01F 15/07 | 100/8 |
| 2003/0093979 A1 * | 5/2003 | Fukumori | A01F 15/085 | 53/587 |
| 2004/0074209 A1 * | 4/2004 | Fukumori | A01F 15/106 | 53/589 |
| 2005/0247215 A1 * | 11/2005 | Biziorek | A01F 15/07 | 100/88 |
| 2009/0107102 A1 * | 4/2009 | Biziorek | A01F 15/0883 | 56/341 |
| 2009/0272072 A1 * | 11/2009 | Paillet | A01F 15/0715 | 53/118 |
| 2009/0282788 A1 * | 11/2009 | McClure | A01F 15/0715 | 53/587 |
| 2010/0024357 A1 * | 2/2010 | Viaud | A01F 15/071 | 53/116 |
| 2012/0096827 A1 * | 4/2012 | Chaney | A01F 15/0833 | 56/341 |
| 2014/0165856 A1 * | 6/2014 | Varley | A01F 15/0833 | 100/43 |
| 2014/0261022 A1 * | 9/2014 | Smith | A01F 15/0883 | 100/87 |
| 2019/0387684 A1 * | 12/2019 | Denis | A01F 15/0705 | |
| 2020/0015423 A1 * | 1/2020 | Mainero | A01F 15/071 | |
| 2020/0015428 A1 * | 1/2020 | Mainero | A01F 15/141 | |
| 2021/0105947 A1 * | 4/2021 | Shonk | A01F 15/106 | |
| 2021/0127580 A1 * | 5/2021 | Singh | A01D 89/002 | |
| 2021/0127581 A1 * | 5/2021 | McClure | F16D 13/10 | |
| 2021/0137014 A1 * | 5/2021 | Simmons | A01F 15/0715 | |
| 2021/0144927 A1 * | 5/2021 | Shenk | A01F 15/18 | |
| 2021/0176921 A1 * | 6/2021 | Singh | F16H 61/4052 | |
| 2021/0219496 A1 * | 7/2021 | Roberge | A01D 90/10 | |
| 2021/0267129 A1 * | 9/2021 | McClure | A01F 15/10 | |

FOREIGN PATENT DOCUMENTS

| | | |
|---|---|---|
| EP | 1 252 813 B2 | 6/2012 |
| EP | 2777382 A1 | 9/2014 |
| FR | 2313861 A1 | 1/1977 |
| FR | 2 517 929 | 6/1983 |
| GB | 2137925 A | 10/1984 |

\* cited by examiner

FRAME ASSEMBLY FOR AN AGRICULTURAL ROUND BALER

BACKGROUND OF THE INVENTION

The present invention pertains to agricultural round balers and, more specifically, to a structural framework of an agricultural round baler.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw (such as wheat or oat straw) which is to be picked up by the baler. The cut crop material is typically raked into a windrow, and a baler, such as a large square baler or round baler, straddles the windrows and travels along the windrows to pick up the crop material and form it into bales.

A round baler may generally include a frame, supported by wheels, a hydraulic system, a pickup unit to engage and lift the crop material into the baler, a cutting assembly, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting assembly. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

Traditionally, the frame of the baler is composed of a single or one-size main frame, which defines the roller fixation points, drives, and tail gate pivot axis. Since the positions of the roller fixation points, drives, and tail gate help to define the bale chamber, the one-size frame thereby also determines the resulting size of the bale which is produced by the bale chamber. Hence, variously sized balers which produce differently sized bales each have a differing frame. As can be appreciated, a manufacturing company may incur additional costs in designing a separate and unique frame for each differently sized baler.

What is needed in the art is a cost-effective frame assembly for an agricultural round baler.

SUMMARY OF THE INVENTION

In one exemplary embodiment formed in accordance with the present invention, there is provided a multi-part frame assembly of an agricultural round baler. The frame assembly includes a universal main frame and a pair of interchangeable frame modules removably connected to the main frame. Each frame module of the pair of frame modules includes at least one roller mount configured for mounting the at least one roller and a tail gate mount configured for mounting the tail gate. The pair of frame modules defines a baler size for producing a correspondingly sized round bale such that interchanging the frame modules will produce a different baler size of the baler, without needing to change the main frame.

In another exemplary embodiment formed in accordance with the present invention, there is provided a frame assembly of an agricultural round baler. The agricultural round baler includes at least one roller and a tail gate. The frame assembly includes a main frame and a pair of frame modules removably connected to the main frame. Each frame module of the pair of frame modules includes at least one roller mount configured for mounting the at least one roller and a tail gate mount configured for mounting the tail gate and defining a pivot axis of the tail gate. The pair of frame modules defines a baler size for producing a correspondingly sized round bale.

In yet another exemplary embodiment formed in accordance with the present invention, there is provided an agricultural round baler for baling crop material in a field. The agricultural round baler includes a plurality of rollers defining a bale chamber, a tail gate, and a frame assembly. The frame assembly includes a main frame and a pair of frame modules removably connected to the main frame. Each frame module of the pair of frame modules includes at least one roller mount and a tail gate mount defining a pivot axis of the tail gate. At least one roller of the plurality of rollers is mounted to the at least one roller mount and the tail gate is pivotally mounted to the tail gate mount. The pair of frame modules defines a baler size for producing a correspondingly sized round bale.

One possible advantage of the exemplary embodiment of the frame assembly of the agricultural baler is that the interchangeable frame modules contain all the necessary changes between bale sizes, which significantly reduces the complexity and cost in manufacturing variously sized balers.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
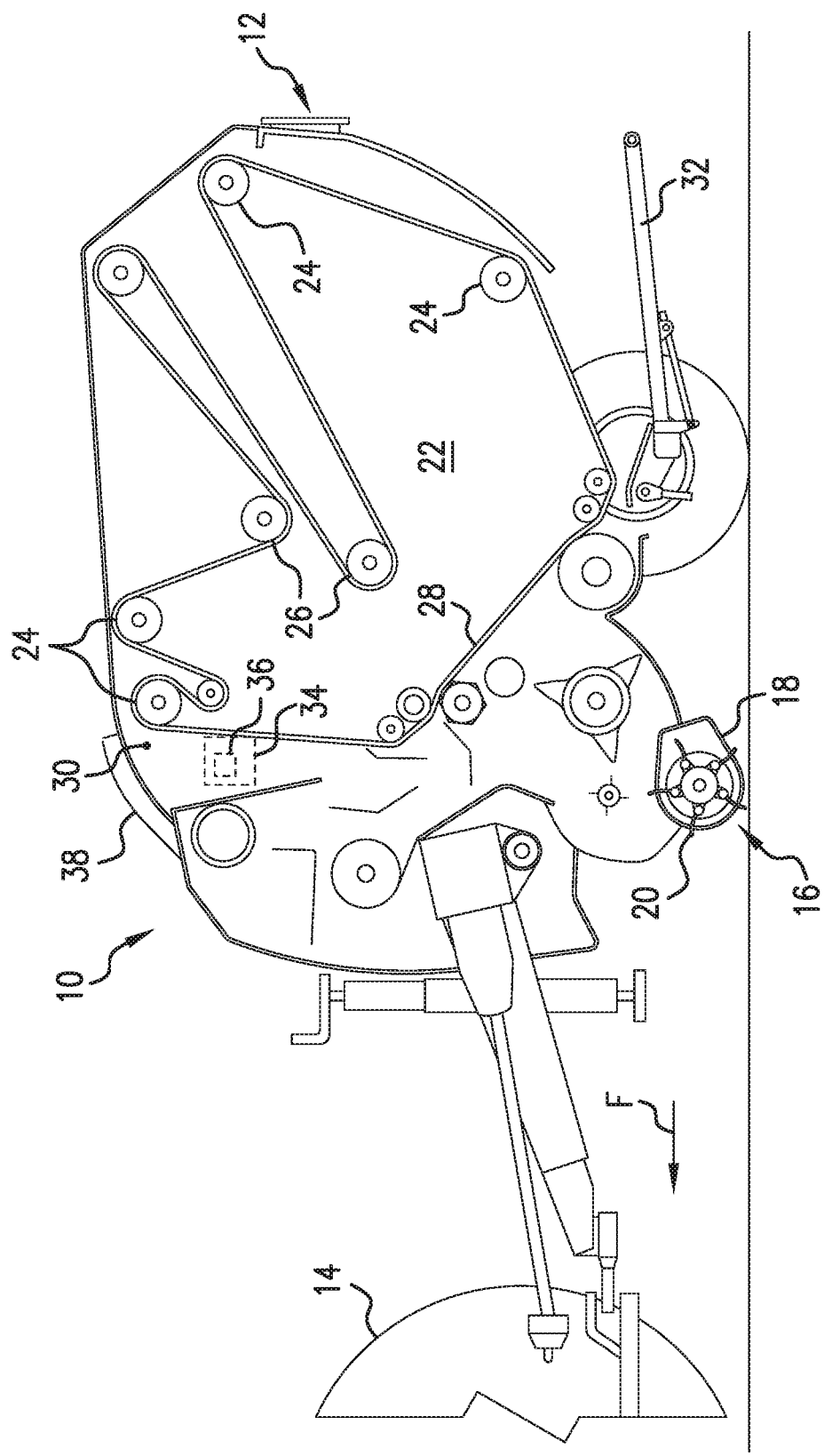
FIG. 1 illustrates a side cross-sectional view of a known agricultural round baler.

Referring now to the drawings, and more particularly to FIG. 1, there is shown a cross-sectional, side view of a known round baler 10 which may be towed by a vehicle 14 in a forward direction of travel F. The vehicle 14 may be any desired vehicle, such as an agricultural vehicle in the form of a tractor 14.

Crop material is lifted from windrows into the baler 10 by a pickup unit 16. The pickup unit 16 includes a rotating pickup reel 18 with tine bars and tines 20, which move the crop rearward toward a variable bale chamber 22. The reel 18 is rotatable in an operating direction for lifting the crop material off of the ground and a reverse direction, i.e., opposite to the operating direction.

The bale chamber 22 is configured as a variable bale chamber 22 which includes multiple rolls or rollers 24, 26, such as various stationary rollers 24 and movable rollers 26, actuators and pivot arms coupled to the movable rollers 26, and at least one belt 28. The rollers 24, 26 may comprise a floor roller, starter roller, fixed roller(s), pivot roller(s), stripper roller, and/or follower roller(s). Together, the rollers 24, 26 and the belt(s) 28 create a round circulating chamber 22 which expands in between an empty bale position and a full bale position for engaging and rolling the bale. As the bale grows inside the chamber 22 it begins to act upon the belts 28 such that the belts 28 pull against the pivot arms which in turn causes the movable rollers 26 to move upwardly so that the variable bale chamber 22 incrementally expands with the size of the bale.

When the bale reaches a predetermined size, the bale is wrapped with a wrapping material (e.g., mesh or twine) by a wrapper. Then, once fully wrapped, the bale is ejected out of the tail gate 12. The tail gate 12 may pivot upwardly about pivot axis 30 to open the bale chamber 22. Then, the bale rolls out of the bale chamber 22 and onto a bale ejector or kicker 32, which pushes the bale rearwardly away from the baler 10 so that the tail gate 12 may downwardly pivot unencumbered by the ejected bale.

The baler 10 can further include an electrical processing circuit 34, e.g. controller 34 with a memory 36, for conducting various baling procedures. For instance, the controller 34 can be configured for carrying out the bale discharge operation. Hence, the controller 34 may open the tail gate 12 via accompanying actuators upon sensing a full bale condition by a bale-size sensor.

The baler 10 has a main frame 38 which supports the various components of the baler 10, including the roller fixation points, drives, and tail gate pivot point 30. The main frame 38 is a single or one-size main frame 38. In other words, the main frame 38, which may be a welded construction, is a one-size main frame 38 which dictates the size of the bale chamber 22. Thereby, the main frame 38 also dictates the size of the bale which is produced by the bale chamber 22. Hence, variously sized balers which produce differently sized bales each have a differing main frame. As can be appreciated, designing a different main frame for each size of bale may place a significant burden on the manufacturing company which manufactures the baler. For instance, designing several main frame structures may take additional design time, test time, and increase the manufacturing tooling investment and complexity.

Figure 2:
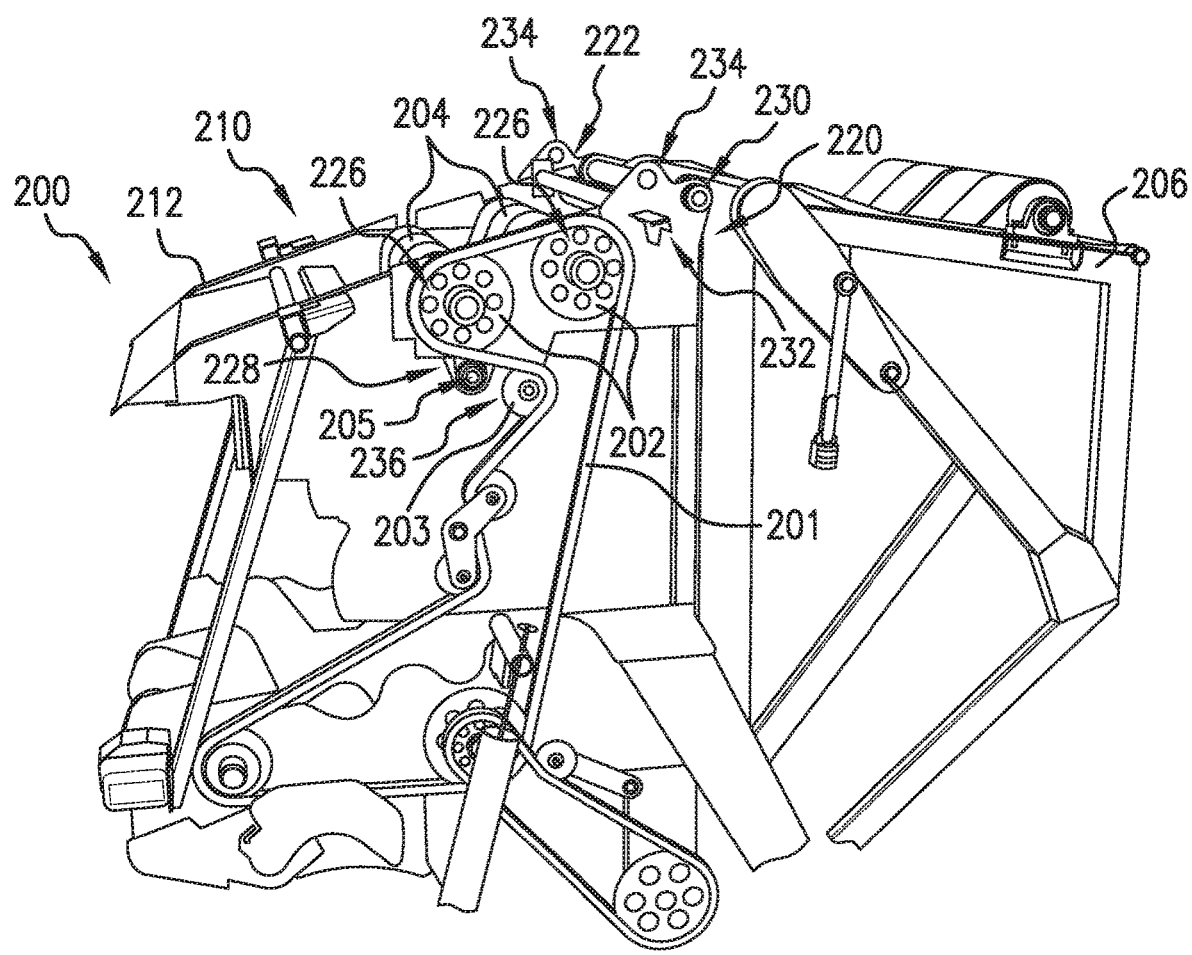
FIG. 2 illustrates a perspective view of an agricultural round baler, the baler having a frame assembly with a main frame and interchangeable frame modules, in accordance with an exemplary embodiment of the present invention.
Figure 3:
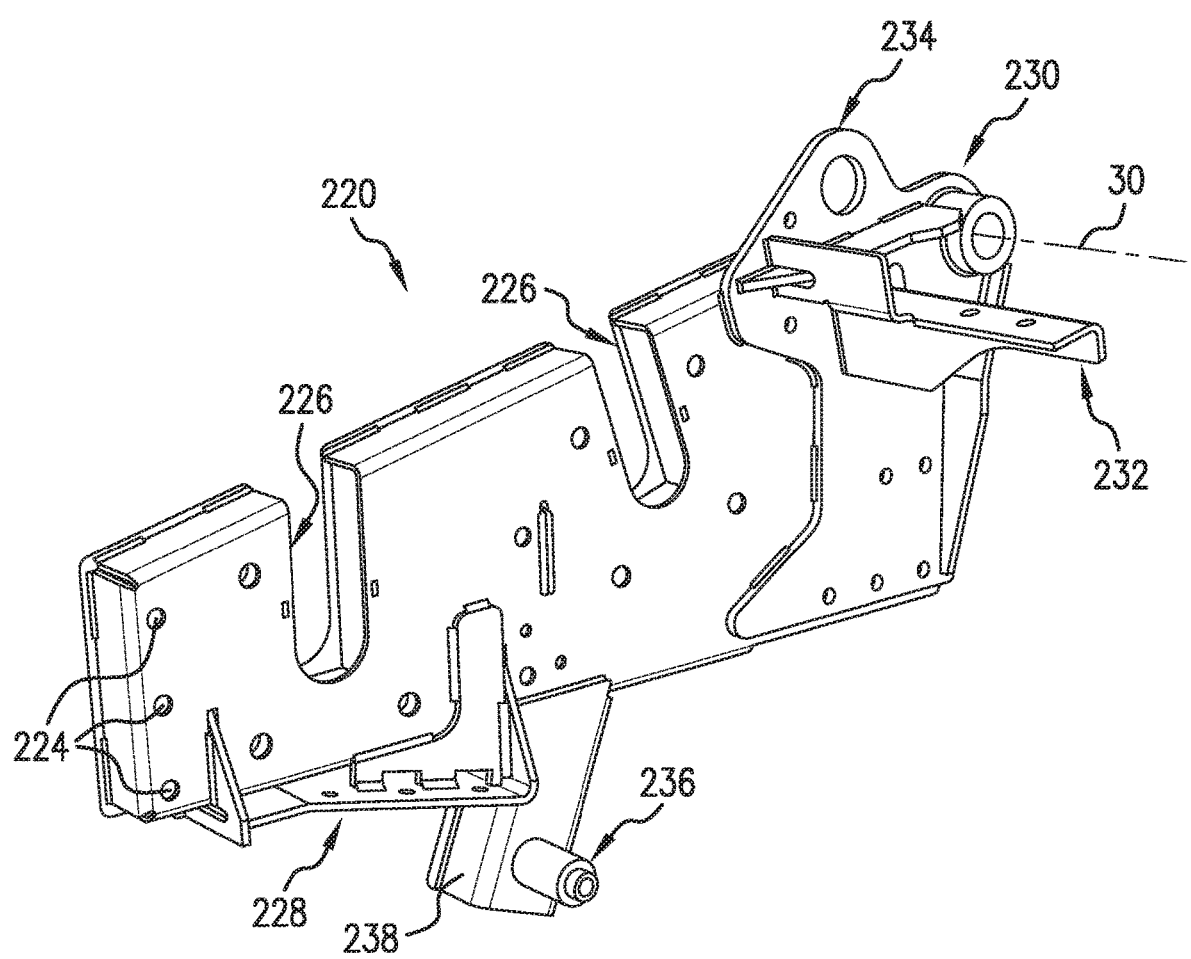
FIG. 3 illustrates a perspective view of the left frame module of FIG. 2.

Referring now collectively to FIGS. 2-3, there is shown an embodiment of a round baler 200 with a frame assembly 210 that includes a standardized or universal main frame 212 and a pair of interchangeable frame modules 220, 222 for tailoring the baler size of the round baler 200, i.e., the size of the bale produced by the round baler 200. The round baler 200 may be substantially similar to the round baler 10 as described above, except that the round baler 200 includes the frame assembly 210 instead of the one-size main frame 38. The frame assembly 210 supports the various components of the round baler 200. For instance, the frame assembly 210 supports the roller drive architecture including the conveyor 201, e.g. drive chain 201, and sprockets 202, 203 coupled to the drive chain 201, fixed and idler rollers 204, 205 operably connected to the sprockets 202, and the tail gate 206.

The main frame 212 may comprise a welded construction of one or more component. The upper portion on each side of the main frame 212 may include a recess or cutout for accommodating the frame module 220, 222. The main frame 212 may comprise any desired material, such as metal and/or plastic.

Each frame module 220, 222 is removably connected to the main frame 212. For example, each frame module 220, 222 may include one or more receiving holes 224 for receiving corresponding fastener(s), such as bolts and/or screws, that removably attach each respective frame module 220, 222 to the corresponding sides of the main frame 212. The left and right frame modules 220, 222 may substantially mirror one another, except that the left frame module 220 may include additional mounting features for supporting the roller drive architecture of the round baler 200. For example, both frame modules 220, 222 may include at least one roller mount 226, 228 for mounting any desired roller 204, 205, a tail gate mount 230 defining the pivot point 30, i.e., axis, of the tail gate 206, a side panel mount 232 for mounting a respective side panel of round baler 200, and a lift-hook mounting point 234 for receiving a lift hook to lift the round baler 200. The left frame module 220, as viewed in the forward direction of travel, further includes a chain mount 236 to which the chain sprocket 203 and drive chain 201 are mounted. Thereby, the frame modules 220, 222 may collectively support the drive chain 201, sprockets 202, 203, fixed and idler rollers 204, 205, and the tail gate 206. As can be appreciated, the body of each frame module 220, 222 may comprise one or more components and any desired material. The frame modules 220, 222 may correspond to a 1.65 meter-sized baler (5.4 foot-sized baler).

The at least one roller mount 226, 228 of each frame module 220, 222 mounts at least one roller 204, 205. The at least one roller mount 226 may include two fixed-roller mounts 226 for respectively mounting two fixed rollers 204 and a single idler roller mount 228 for mounting the idler roller 205. Hence, the roller mounts 226, 228 may define and set the roller fixation points of the fixed and idler rollers 204, 205. Each fixed roller mount 226 may comprise an open recess and/or accompanying brackets for receiving and connecting the fixed rollers 204 to the body of the frame module 220, 222. The idler roller mount 228 may comprise an opening and/or accompanying bracket for connecting the idler roller to the body of the frame module 220, 222. As can be appreciated, the set locations of the rollers 204, 205 on the frame modules 220, 222 in part determines the size of bale which is producible by the round baler 200.

The tail gate mount 230 may be connected to the upper, rear end of each frame module 220, 222. The tail gate mount 230 defines the pivot axis 30 of the tail gate 206, which thereby helps to define the overall size of the bale which may be ejected by the round baler 200. Each tail gate mount 230 may comprise a through hole, within a designated portion, e.g. plate, of the frame module 220, 222, for receiving a mounting bar of the tail gate 206.

The side panel mount 232 of each frame module 220, 222 may be located adjacent to the tail gate mount 230. As shown, each side panel mount 232 may comprise a bracket which extends outwardly from the surface of the frame module 220, 222. Yet, the side panel mounts 232 may or may not extend beyond the surface of the frame module 220, 222.

The side panel mounts 232 may mount any desired side panels which correspond to a desired baler size.

Each lift-hook mounting point 234 is located at the top of each frame module 220, 222. Each lift-hook mounting point 234 may comprise a receiving hole, within a designated portion, e.g. plate, of the frame module 220, 222, for receiving a respective lift hook in order to lift the round baler 200. It should be appreciated that each frame module 220, 222 may or may not include a lift-hook mounting point 234.

As discussed above, the left frame module 220 may additionally include one or more mounting features for mounting the roller drive architecture, e.g. drive chain 201 and sprockets 202, 203, of the round baler 200. For example, the left frame module 220 may further include a chain mount 236 and a downwardly extending protrusion 238 upon which the chain mount 236 is connected. The chain mount rotatably supports the chain sprocket 203. The chain mount 236 may be located at the bottom of the frame module 220, underneath the roller mounts 226, 228. The chain mount 236 may comprise a rod that extends outwardly from the body of the frame module 220. More particularly, the chain mount 236 extends outwardly and perpendicularly from the protrusion 238. The chain mount 236 may further include one or more brackets and/or fasteners for securing the chain sprocket 203 to the frame module 220. The protrusion 238 may be a part of the body of the frame module 220, or alternatively, the protrusion may be a separate component which is affixed to the body of the frame module 220. The protrusion 238 may be in the form of a beam connected to the body of the frame module 220. The protrusion 238 may comprise any desired material. It should be appreciated that the left frame module 220 may include more than one chain mount 236 may include any desired number of sprockets 202, 203 for support the drive chain 201 and/or driving any desired number of rollers 204, 205.

Figure 4:
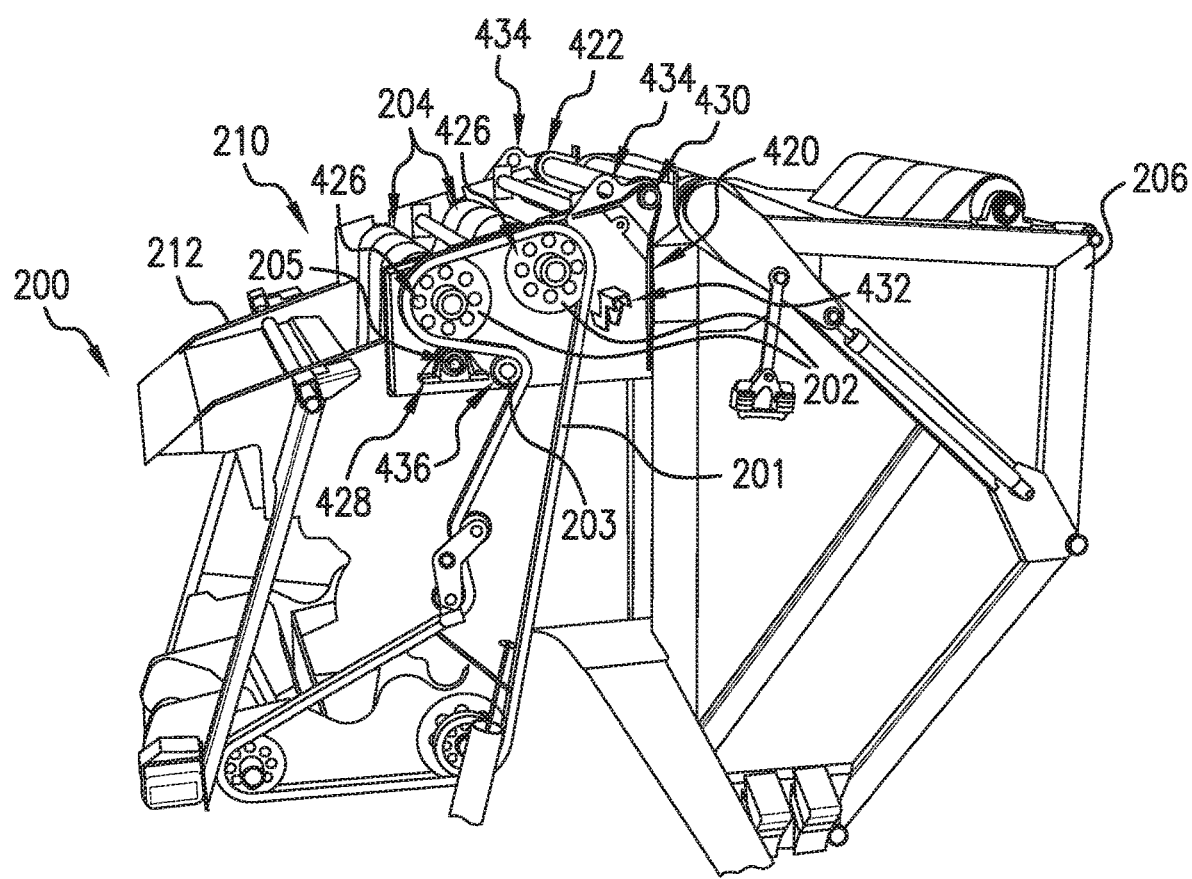
FIG. 4 illustrates a perspective view of the agricultural round baler of FIGS. 2-3 with differing, interchangeable frame modules, in accordance with an exemplary embodiment of the present invention.

Referring now to FIG. 4, there is shown another embodiment of a pair of frame modules 420, 422. The pair of frame modules 420, 422 may be substantially similar to the frame modules 220, 222, except that the frame modules 420, 422 have a differing mounting architecture in order to procedure a differently sized baler for producing a correspondingly sized bale. For example, the frame modules 420, 422 may have an extended body that is taller than the body of the frame modules 220, 222. Also, for example, the frame modules 420, 422 may have a differently located idler roller mount 428. Furthermore, the left frame module 420 may not include a protrusion 238; and hence, the chain mount 426 may be located within the body of the frame module 420. The frame modules 420, 422 may correspond to a 1.9 meter-sized baler (6.2 foot-sized baler). Like elements between the frame modules 220, 222, 420, 422 have been identified with like reference characters except with the 400 series designation for the frame modules 420, 422.

Since the frame modules 220, 222 contain all the necessary changes between bale sizes, the frame modules 220, 222 reduce the complexity and cost in manufacturing variously sized balers. A desired set of frame modules 220, 222, 420, 422 may be connected to the main frame 212 at the time of manufacture of the baler 200, or the frame modules 220, 222 may be interchanged with another set of frame modules 420, 422 after the sale of the baler 200. For example, a farmer may alter the size of his current baler 200 by buying new frame modules 420, 422 and accordingly interchanging the existing frame modules 220, 222 with the new frame modules 420, 422 to achieve a desired baler size. As can be appreciated, the farmer may also need to alter the belt sizes in order to achieve a differently sized bale chamber for producing a correspondingly sized bale.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A frame assembly of an agricultural round baler, the agricultural round baler comprising at least one roller and a tail gate, and the frame assembly comprising:
    a universal main frame; and
    a first and a second pair of frame modules, one of the first pair of frame modules and the second pair of frame modules being removably connected to the universal main frame, and each frame module of the first and second pair of frame modules comprising at least one roller mount configured for mounting the at least one roller and a tail gate mount configured for mounting the tail gate and defining a pivot axis of the tail gate, the first pair of frame modules defining a first baler size producing a correspondingly first sized round bale, the second pair of frame modules defining a second baler size producing a correspondingly second sized round bale, the first sized round bale being a different size than the second sized round bale, the first pair of frame modules and the second pair of frame modules being interchangeable in their connection with the universal main frame.

2. The frame assembly of claim 1, wherein the at least one roller mount sets a roller fixation point of the at least one roller.

3. The frame assembly of claim 1, wherein the agricultural round baler further comprises a drive chain for driving the at least one roller, and one frame module of each pair of frame modules further comprises a chain mount configured for mounting the drive chain.

4. The frame assembly of claim 1, wherein the at least one roller of the agricultural round baler comprises a first fixed roller and a second fixed roller, and the at least one roller mount of each frame module of the pair of frame modules comprises a first roller mount configured for mounting the first fixed roller and a second roller mount configured for mounting the second fixed roller.

5. The frame assembly of claim 4, wherein the at least one roller of the agricultural round baler further comprises an idler roller, and the at least one roller mount of each frame module of each pair of frame modules further comprises an idler roller mount configured for mounting the idler roller.

6. The frame assembly of claim 1, wherein each frame module of each pair of frame modules further comprises a lift-hook mounting point.

7. The frame assembly of claim 1, wherein the agricultural round baler comprises a pair of side panels, and each frame module of each pair of frame modules further comprises a side panel mount configured for mounting a respective side panel of the pair of side panels.

8. The frame assembly of claim 1, wherein each frame module of each pair of frame modules further comprises at least one through hole for receiving at least one fastener for removably connecting each frame module of the pair of frame modules to the main frame.

9. The frame assembly of claim 1, wherein the universal main frame comprises a first side and a second side, and each pair of frame modules comprises a first frame module removably connected to the first side of the main frame and a second frame module removably connected to the second side of the main frame.

10. An agricultural round baler for baling crop material in a field, comprising:
- a plurality of rollers defining a bale chamber;
- a tail gate; and
- a frame assembly, comprising:
  - a universal main frame; and
  - a first and a second pair of frame modules, one of the first pair of frame modules and the second pair of frame modules being removably connected to the universal main frame, and each frame module of the first and second pair of frame modules comprising at least one roller mount and a tail gate mount defining a pivot axis of the tail gate, and at least one roller of the plurality of rollers being mounted to the at least one roller mount and the tail gate being pivotally mounted to the tail gate mount, the first pair of frame modules defining a first baler size producing a correspondingly first sized round bale, the second pair of frame modules defining a second baler size producing a correspondingly second sized round bale, the first sized round bale being a different size than the second sized round bale, the first pair of frame modules and the second pair of frame modules being interchangeable in their connection with the universal main frame.

11. The agricultural round baler of claim 10, wherein the at least one roller mount sets a roller fixation point of the at least one roller of the plurality of rollers.

12. The agricultural round baler of claim 10, further comprising a drive chain for driving the at least one roller of the plurality of rollers, and one frame module of each pair of frame modules further comprises a chain mount to which the drive chain is mounted.

13. The agricultural round baler of claim 10, wherein the plurality of rollers comprises a first fixed roller and a second fixed roller, and the at least one roller mount of each frame module of each pair of frame modules comprises a first roller mount configured for mounting the first fixed roller and a second roller mount configured for mounting the second fixed roller.

14. The agricultural round baler of claim 13, wherein the plurality of rollers further comprises an idler roller, and the at least one roller mount of each frame module of each pair of frame modules further comprises an idler roller mount configured for mounting the idler roller.

15. The agricultural round baler of claim 10, wherein each frame module of each pair of frame modules further comprises a lift-hook mounting point.

16. The agricultural round baler of claim 10, further comprising a pair of side panels, and each frame module of each pair of frame modules further comprises a side panel mount configured for mounting a respective side panel of the pair of side panels.

17. The agricultural round baler of claim 10, wherein each frame module of each pair of frame modules further comprises at least one through hole for receiving at least one fastener for removably connecting each frame module of the pair of frame modules to the main frame.

18. The agricultural round baler of claim 10, wherein the universal main frame comprises a first side and a second side, and each pair of frame modules comprises a first frame module removably connected to the first side of the main frame and a second frame module removably connected to the second side of the main frame.

* * * * *